US012471061B2

(12) United States Patent
Wang et al.

(10) Patent No.: US 12,471,061 B2
(45) Date of Patent: Nov. 11, 2025

(54) SIDELINK USER EQUIPMENT ASSISTANCE INFORMATION TRANSMISSION METHOD BETWEEN USER EQUIPMENTS

(71) Applicant: DATANG MOBILE COMMUNICATIONS EQUIPMENT CO., LTD., Beijing (CN)

(72) Inventors: Da Wang, Beijing (CN); Yali Zhao, Beijing (CN); Jiamin Liu, Beijing (CN); Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 593 days.

(21) Appl. No.: 17/292,697

(22) PCT Filed: Dec. 3, 2019

(86) PCT No.: PCT/CN2019/122632
§ 371 (c)(1),
(2) Date: May 10, 2021

(87) PCT Pub. No.: WO2020/134902
PCT Pub. Date: Jul. 2, 2020

(65) Prior Publication Data

US 2022/0015065 A1 Jan. 13, 2022

(30) Foreign Application Priority Data

Dec. 28, 2018 (CN) ......................... 201811628995.0

(51) Int. Cl.
*H04W 72/02* (2009.01)
*H04W 4/06* (2009.01)
(Continued)

(52) U.S. Cl.
CPC ....... *H04W 72/02* (2013.01); *H04W 72/0446* (2013.01); *H04W 4/46* (2018.02)

(58) Field of Classification Search
CPC ...... H04L 67/104; H04W 84/18; H04W 4/46; H04W 72/02; H04W 72/044; H04W 72/0446; H04W 72/04
See application file for complete search history.

(56) References Cited

U.S. PATENT DOCUMENTS 10,820,301 B2 * 10/2020 Jung ........................ H04W 4/48
12,048,050 B2 * 7/2024 Wang .................... H04W 76/28
(Continued)

FOREIGN PATENT DOCUMENTS

CN 104184540 A 12/2014
CN 104796845 A 7/2015
(Continued)

OTHER PUBLICATIONS

"Sidelink resource allocation mode 2", R1-1812209, 3GPP TSG RAN WG1 Meeting #95, Spokane, USA, Nov. 12-16, 2018, all pages.

(Continued)

*Primary Examiner* — Jenee Holland
(74) *Attorney, Agent, or Firm* — Ladas & Parry, LLP

(57) ABSTRACT

An information transmission method includes: receiving, by first UE, Sidelink UE assistance information transmitted by second UE, wherein the Sidelink UE assistance information includes at least one piece of pattern information; determining, by the first UE according to the Sidelink UE assistance information, a resource occupied by transmission between the first UE and the second UE.

14 Claims, 3 Drawing Sheets

SL

Tx UE

Rx UE unicast

(51) Int. Cl.

| | |
|---|---|
| ***H04W 4/08*** | (2009.01) |
| ***H04W 4/46*** | (2018.01) |
| ***H04W 72/0446*** | (2023.01) |
| ***H04W 72/20*** | (2023.01) |
| ***H04W 72/30*** | (2023.01) |
| ***H04W 92/18*** | (2009.01) |

(56) References Cited

U.S. PATENT DOCUMENTS

2007/0211657 A1* 9/2007 McBeath .......... H04W 72/0446 370/347
2010/0049851 A1* 2/2010 Garrison ............... G06F 9/5061 707/E17.032
2015/0126188 A1* 5/2015 Lindoff ................. H04W 76/14 455/434
2015/0149813 A1* 5/2015 Mizuno ............... G06F 11/1484 714/4.11
2015/0181583 A1* 6/2015 Siomina .............. H04W 72/044 370/330
2015/0319742 A1* 11/2015 Koivisto ............... H04W 72/20 370/329
2016/0014667 A1 1/2016 Sirotkin et al.
2016/0057603 A1* 2/2016 Tiirola ............. H04W 72/0446 370/329
2016/0255647 A1* 9/2016 Zhu ..................... H04W 72/542 370/329
2016/0338055 A1* 11/2016 Yang ..................... H04L 5/0069
2016/0338095 A1* 11/2016 Faurie ................... H04W 72/23
2016/0345297 A1* 11/2016 Chen ..................... H04W 72/02
2016/0366676 A1* 12/2016 Fujishiro ............... H04W 72/20
2017/0019887 A1* 1/2017 Jiang ................. H04W 72/1263
2017/0041894 A1* 2/2017 Lee .................. H04W 56/0025
2017/0086175 A1* 3/2017 Yasukawa ............. H04L 5/0053
2017/0117757 A1* 4/2017 Park ..................... H04W 52/58
2017/0118621 A1* 4/2017 Sorrentino ........ H04W 72/0453
2017/0142741 A1* 5/2017 Kaur ..................... H04W 72/02
2017/0230928 A1* 8/2017 Basu Mallick ... H04W 56/0045
2017/0230959 A1* 8/2017 Wu ....................... H04W 72/02
2017/0230996 A1* 8/2017 Li ......................... H04W 72/20
2017/0272222 A1* 9/2017 Fr?Berg Olsson .... H04L 5/0051
2017/0273064 A1* 9/2017 Adachi ................. H04W 76/14
2017/0289733 A1* 10/2017 Rajagopal ............. H04L 5/0082
2017/0353819 A1* 12/2017 Yin ......................... H04W 4/70
2018/0069664 A1* 3/2018 Khoryaev ............. H04L 1/1621
2018/0098322 A1* 4/2018 Yoon ................. H04W 56/0005
2018/0132086 A1 5/2018 Zhang et al.
2018/0132297 A1* 5/2018 Li ....................... H04W 72/121
2018/0176058 A1* 6/2018 Kim .................... H04L 27/2675
2018/0206140 A1* 7/2018 Panteleev ............. H04W 48/16
2018/0302886 A1* 10/2018 Pan ....................... H04W 72/21
2019/0045521 A1 2/2019 Hong et al.
2019/0075548 A1 3/2019 Lee et al.
2019/0239039 A1* 8/2019 Hahn .................. H04W 72/044
2020/0045674 A1* 2/2020 Tseng .................... H04W 76/14
2020/0053724 A1* 2/2020 MolavianJazi ....... H04L 5/0048
2020/0120674 A1* 4/2020 Lee ................... H04W 72/0453
2020/0170002 A1* 5/2020 Lee ................... H04W 72/0453
2021/0119843 A1* 4/2021 Zhang ................... H04L 5/0051
2021/0168814 A1* 6/2021 Chen ..................... H04W 72/02
2021/0219111 A1* 7/2021 Lin ......................... H04W 4/08
2021/0250910 A1* 8/2021 Park ...................... H04L 5/0044
2021/0282174 A1* 9/2021 Cao ......................... H04W 4/40
2021/0306824 A1* 9/2021 Li ........................... H04W 4/40
2022/0007403 A1* 1/2022 Li ......................... H04L 1/1812
2022/0015065 A1* 1/2022 Wang ................ H04W 72/0446
2022/0217046 A1* 7/2022 Sartori ................ H04L 41/5009

FOREIGN PATENT DOCUMENTS

CN 107041001 A 8/2017
CN 108605329 A 9/2018
WO 2017011106 A1 1/2017
WO 2017150956 A1 9/2017

OTHER PUBLICATIONS

"Resource Allocation Schemes for NR V2X Sidelink Communication", R1-1812491, 3GPP TSG RAN WG1 Meeting #95, Spokane, USA, Nov. 12-16, 2018, all pages.
"Further Considerations on Sidelink Unicast/Groupcast/Broadcast for NR V2X Communication", R1-1812492, 3GPP TSG RAN WG1 Meeting #95, Spokane, USA, Nov. 12-16, 2018, all pages.
"Editorial Corrections to Support of Multiple SPS Configurations", R2-1705976, 3GPP TSG-RAN WG2 Meeting #98, Hangzhou, China, May 15-19, 2017, all pages.
First Office Action and Search Report from CN app. No. 201811628995.0, dated Jan. 11, 2021, with English translation from Global Dossier, all pages.
International Search Report from PCT/CN2019/122632, dated Feb. 26, 2020, with English translation from WIPO, all pages.
Written Opinion of the International Searching Authority from PCT/CN2019/122632, dated Feb. 26, 2020, with English translation from WIPO, all pages.
International Preliminary Report on Patentability from PCT/CN2019/122632, dated Jun. 16, 2021, with English translation from WIPO, all pages.
European Search Report for European Patent Application No. 19903512.2, issued on Jan. 21, 2022.

* cited by examiner

SIDELINK USER EQUIPMENT ASSISTANCE INFORMATION TRANSMISSION METHOD BETWEEN USER EQUIPMENTS

CROSS-REFERENCE TO RELATED APPLICATIONS

The present application is the U.S. national phase of PCT Application No. PCT/CN2019/122632 filed on Dec. 3, 2019, which claims a priority to the Chinese patent application 201811628995.0 filed on Dec. 28, 2018, the disclosures of which are incorporated herein by reference in their entireties.

TECHNICAL FIELD

The present disclosure relates to the field of communication technology, in particular to information transmission method and user equipment.

BACKGROUND

There is a half-duplex issue in sidelink communication between user equipments (UEs), i.e., UE cannot receive and transmit simultaneously on the sidelink (due to the fact that UE has only one link available for either transmitting or receiving at a time).

The $5^{th}$ Generation (5G) vehicle-to-everything (V2X) provides two operation modes for sidelink, namely, mode1 and mode2:

the mode1 is a base station scheduling mode;

the mode2 is a mode in which UE selects a resource according to a channel monitoring result.

In the mode2, as shown in FIG. 1, taking a unicast scenario in which transmitting (Tx) UE (UE serving as a transmitting terminal) operating in the mode2 transmits information to receiving (Rx) UE (UE serving as a receiving terminal) for example, and assuming that the Rx UE (which may operate in the mode1 or mode2) also support communication with other UE, the Rx UE, while transmitting, cannot receive information transmitted by the Tx UE due to the half-duplex issue. In other words, if the Tx UE selects, for information transmission, a same time-domain resource (e.g., the same slot) as that used by the Rx UE to transmit information, the Rx UE cannot receive the information transmitted by the Tx UE, which degrades the reliability of unicast communication. Moreover, since retransmission needs to be performed in the case that the Rx UE fails to receive the information, the latency requirement of unicast service cannot be met.

As shown in FIG. 2, a similar problem would occur for a multicast scenario. Rx UE in a group cannot receive information from a Tx UE due to the half-duplex issue, thus the reliability of multicast communication is degraded, and the latency requirement of multicast communication cannot be met.

SUMMARY

Embodiments of the present disclosure provide an information transmission method and user equipment, to avoid the problem of collision between signal transmission and signal reception due to the half-duplex issue, thereby improving the communication reliability of unicast/multicast.

To resolve the foregoing technical problem, an embodiment of the present disclosure provides the following technical solution:

an information transmission method, including:

receiving, by first UE, SL UE assistance information transmitted by second UE, wherein the SL UE assistance information includes at least one piece of pattern information;

determining, by the first UE according to the SL UE assistance information, a resource occupied by transmission between the first UE and the second UE.

The receiving, by the first UE, the SL UE assistance information transmitted by the second UE includes:

receiving, by the first UE, the SL UE assistance information transmitted by at least one second UE.

The pattern information includes at least one of: (i) a transmission periodicity, (ii) a time interval between a time-domain resource occupied by the SL UE assistance information and a time-domain resource occupied by a transport block, (iii) a quantity of repetitions of the transport block within the periodicity, (iv) an indication of a starting symbol, a symbol length and a mapping type of the transport block; wherein the mapping type includes a slot based mapping or a symbol based mapping.

The receiving, by the first UE, the SL UE assistance information transmitted by the second UE includes:

receiving, by the first UE, the SL UE assistance information transmitted by the second UE via a radio resource control (RRC) message or a medium access control control element (MAC CE).

The first UE is a transmitting UE and the second UE is a receiving UE, and the method further includes:

receiving, by the first UE, SL UE assistance update information transmitted by the second UE via a radio resource control (RRC) message or a medium access control control element (MAC CE).

The SL UE assistance update information includes SL UE assistance information for all services in an active state; or, the SL UE assistance update information includes SL UE assistance information for a newly activated and/or newly deactivated service.

The determining, by the first UE according to the SL UE assistance information, the resource occupied by the transmission between the first UE and the second UE includes:

excluding, by the first UE in determining the resource occupied by the transmission between the first UE and the second UE, a time-domain resource at a time moment of $t+offset+y \times Periodicity$ greater than $n+T1$ and less than $n+T2$ in a case that $t+offset$ is less than or equal to $n+T2$;

not excluding a time-domain resource in a case that $t+offset$ is greater than $n+T2$;

where, $y=0, 1, 2, \ldots, N$, N is a positive integer; t is a receiving moment when the first UE receives the SL UE assistance information; offset is a time interval between a time-domain resource occupied by the SL UE assistance information and a time-domain resource occupied by a transport block; n is a time moment when the first UE selects a resource; $n+T1$ is a starting moment of a resource selection window; $n+T2$ is an ending moment of the resource selection window; Periodicity is a transmission periodicity included in the SL UE assistance information.

The determining, by the first UE according to the SL UE assistance information, the resource occupied by the transmission between the first UE and the second UE includes:

excluding, by the first UE in determining the resource occupied by the transmission between the first UE and the second UE, a time-domain resource at a time moment of t+offset+y×Periodicity greater than n+T1 and less than n+T2 and a time-domain resource at a time moment z in a case that t+offset is less than or equal to n+T2;

excluding, by the first UE in determining the resource occupied by the transmission between the first UE and the second UE, a time-domain resource at a time moment z' in a case that t+offset is greater than n+T2;

where, the time moment z is greater than n+T1 and less than n+T2, and z+m×P=t+offset+q×Periodicity, m=1, 2, . . . , N1, q=1, 2, . . . , N2; both N1 and N2 are positive integers;

the time moment z' is greater than n+T1 and less than n+T2, and z'+m'×P=t+offset+q'×Periodicity, m'=1, 2, . . . , N1', q'=1, 2, . . . , N2'; both N1' and N2' are positive integers;

t is a time moment when the first UE receives the SL UE assistance information; offset is a time interval between a time-domain resource occupied by the SL UE assistance information and a time-domain resource occupied by a transport block; n is a time moment when the first UE selects a resource; n+T1 is a starting moment of a resource selection window; n+T2 is an ending moment of the resource selection window; P is a transmission periodicity of the transmission between the first UE and the second UE; Periodicity is a transmission periodicity included in the SL UE assistance information.

The information transmission method further includes:

narrowing down value ranges of m, q, m', q' respectively and re-determining a resource in a case that a quantity of optional resources in the resource selection window is less than a preset threshold.

There are at least two second UEs, and the determining, by the first UE according to the SL UE assistance information, the resource occupied by the transmission between the first UE and the second UE includes:

grouping the at least two second UEs, and determining the resource occupied by the transmission between the first UE and the second UE according to the SL UE assistance information of each second UE in each group.

The information transmission method further includes:

in a case that a quantity of optional resources in the resource selection window is less than a preset threshold, grouping the second UEs, and re-determining the resource occupied by the transmission between the first UE and the second UE according to the SL UE assistance information of each second UE in each group.

The determining, by the first UE according to the SL UE assistance information, the resource occupied by the transmission between the first UE and the second UE includes:

determining, by the first UE, at least one pattern from the SL UE assistance information, and transmitting, by the first UE, feedback information about the SL UE assistance information to the second UE, wherein the feedback information indicates or includes the at least one pattern; or, transmitting, by the first UE, feedback information about the SL UE assistance information to the second UE, wherein the feedback information instructs the second UE to retransmit the SL UE assistance information, and the SL UE assistance information includes at least one piece of new pattern information.

The information transmission method further includes:

transmitting, by the first UE, an SL UE assistance information update request to the second UE, wherein the SL UE assistance information update request instructs the second UE to retransmit the SL UE assistance information, and the SL UE assistance information includes at least one piece of new pattern information.

An embodiment of the present disclosure further provides an information transmission method, including:

transmitting, by second UE, SL UE assistance information including at least one piece of pattern information to first UE, such that the first UE determines, according to the SL UE assistance information, a resource occupied by transmission between the first UE and the second UE.

An embodiment of the present disclosure further provides UE, including:

a transceiver module, configured to receive SL UE assistance information transmitted by second UE, wherein the SL UE assistance information includes at least one piece of pattern information;

a processing module, configured to determine, according to the SL UE assistance information, a resource occupied by transmission between the UE and the second UE.

The transceiver module is specifically configured to: receive the SL UE assistance information transmitted by at least one second UE.

The pattern information includes at least one of: (i) a transmission periodicity, (ii) a time interval between a time-domain resource occupied by the SL UE assistance information and a time-domain resource occupied by a transport block, (iii) a quantity of repetitions of the transport block within the periodicity, (iv) an indication of a starting symbol, a symbol length and a mapping type of the transport block; wherein the mapping type includes a slot based mapping or a symbol based mapping.

The transceiver module is specifically configured to:

receive the SL UE assistance information transmitted by the second UE via a radio resource control (RRC) message or a medium access control control element (MAC CE).

The transceiver module is further configured to receive SL UE assistance update information transmitted by the second UE via a radio resource control (RRC) message or a medium access control control element (MAC CE).

The SL UE assistance update information includes SL UE assistance information for all services in an active state; or, the SL UE assistance update information includes SL UE assistance information for a newly activated and/or newly deactivated service.

The processing module is specifically configured to: exclude, in determining the resource occupied by the transmission between the first UE and the second UE, a time-domain resource at a time moment of t+offset+y×Periodicity greater than n+T1 and less than n+T2 in a case that t+offset is less than or equal to n+T2;

not exclude a time-domain resource in a case that t+offset is greater than n+T2;

where, y=0, 1, 2, . . . , N, N is a positive integer; t is a receiving moment when the UE receives the SL UE assistance information; offset is a time interval between a time-domain resource occupied by the SL UE assistance information and a time-domain resource occupied by a transport block; n is a time moment when the UE selects a resource; n+T1 is a starting moment of a resource selection window; n+T2 is an ending moment of the resource selection window; Periodicity is a transmission periodicity included in the SL UE assistance information.

The processing module excludes, in determining the resource occupied by the transmission between the first UE and the second UE, a time-domain resource at a time moment of t+offset+y×Periodicity greater than n+T1 and less than n+T2, and a time-domain resource at a time moment z, in a case that t+offset is less than or equal to n+T2;

the processing module excludes, in determining the resource occupied by the transmission between the first UE and the second UE, a time-domain resource at a time moment z' in a case that t+offset is greater than n+T2;

where, the time moment z is greater than n+T1 and less than n+T2, and z+m×P=t+offset+q×Periodicity, m=1, 2, . . . , N1, q=1, 2, . . . , N2; both N1 and N2 are positive integers;

the time moment z' is greater than n+T1 and less than n+T2, and z'+m'×P=t+offset+q'×Periodicity, m'=1, 2, . . . , N1', q'=1, 2, . . . , N2'; both N1' and N2' are positive integers;

t is a time moment when the UE receives the SL UE assistance information; offset is a time interval between a time-domain resource occupied by the SL UE assistance information and a time-domain resource occupied by a transport block; n is a time moment when the UE selects a resource; n+T1 is a starting moment of a resource selection window; n+T2 is an ending moment of the resource selection window; P is a transmission periodicity of the transmission between the UE and the second UE; Periodicity is a transmission periodicity included in the SL UE assistance information.

The processing module is further configured to:

narrow down value ranges of m, q, m', q' respectively and re-determine a resource in a case that a quantity of resources determined in the resource selection window is less than a preset threshold.

There are at least two second UEs, and the processing module is specifically configured to, in re-determining the resource:

group the at least two second UEs, and determine the resource occupied by the transmission between the first UE and the second UE according to the SL UE assistance information of each second UE in each group.

The processing module is further configured to:

in a case that a quantity of optional resources in the resource selection window is less than a preset threshold, group the second UE, and re-determine the resource occupied by the transmission between the first UE and the second UE according to the SL UE assistance information of each second UE in each group.

The processing module of the UE determines at least one pattern from the SL UE assistance information, and the transceiver module of the UE transmits feedback information about the SL UE assistance information to the second UE, wherein the feedback information indicates or includes the at least one pattern; or, the transceiver module of the UE transmits feedback information about the SL UE assistance information to the second UE, wherein the feedback information instructs the second UE to retransmit the SL UE assistance information, and the SL UE assistance information includes at least one piece of new pattern information.

The transceiver module of the UE transmits an SL UE assistance information update request to the second UE, wherein the SL UE assistance information update request instructs the second UE to retransmit the SL UE assistance information, and the SL UE assistance information includes at least one piece of new pattern information.

An embodiment of the present disclosure further provides UE, including:

a transceiver module, configured to transmit SL UE assistance information including at least one piece of pattern information to first UE, such that the first UE determines, according to the SL UE assistance information, a resource occupied by transmission between the first UE and the second UE.

An embodiment of the present disclosure further provides UE, including a processor, wherein the processor is configured to implement following process: receiving SL UE assistance information transmitted by second UE; determining, according to the SL UE assistance information, a resource occupied by transmission between the UE and the second UE; or, transmitting SL UE assistance information to first UE, such that the first UE determines, according to the SL UE assistance information, a resource occupied by transmission between the first UE and the second UE; wherein the SL UE assistance information includes at least one piece of pattern information.

An embodiment of the present disclosure further provides a computer storage medium including an instruction, wherein the instruction is configured to be executed by a computer, to cause the computer to implement the foregoing information transmission method.

Embodiments of the present disclosure have the following beneficial effects: in the foregoing embodiments of the present disclosure, the first UE receives SL UE assistance information transmitted by the second UE, and the first UE determines, according to the SL UE assistance information, a resource occupied by transmission between the first UE and the second UE, thus the problem of collision between signal transmission and signal reception due to the half-duplex issue is avoided, and the communication reliability of unicast/multicast is improved.

DETAILED DESCRIPTION

Hereinafter, the exemplary embodiments of the present disclosure are described in detail with reference to the accompanying drawings. Although the exemplary embodiments of the present disclosure are illustrated in the accompanying drawings, the disclosure may, however, be embodied in many different forms and should not be construed as being limited to the embodiments set forth herein. Rather, these embodiments are provided so that the present disclosure will be thorough, and will fully convey the scope of the present disclosure to those skilled in the art.

Embodiments of the present disclosure are mainly applied to sidelink communication. The application scenario includes V2X unicast or multicast scenario, i.e., the scenario in which vehicles perform unicast or multicast communication therebetween.

Figure 3:
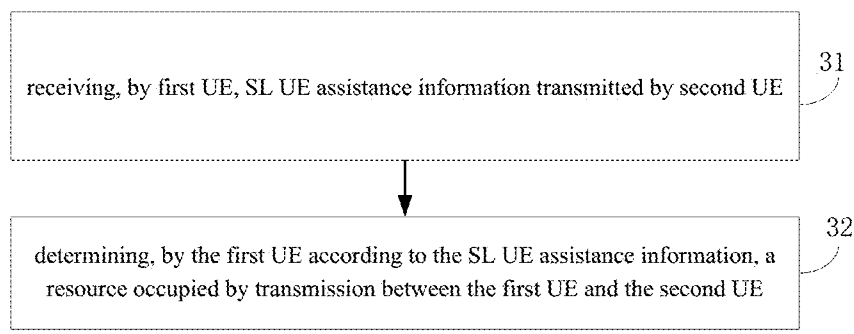
FIG. 3 is a flow diagram of an information transmission method according to the present disclosure.

As shown in FIG. 3, an embodiment of the present disclosure provides an information transmission method. The method includes a step 31 and a step 32, for example.

Step 31, receiving, by first UE, SL UE assistance information transmitted by second UE, wherein the SL UE assistance information includes at least one piece of pattern information.

Step 32, determining, by the first UE according to the SL UE assistance information, a resource occupied by transmission between the first UE and the second UE.

In the foregoing embodiment of the present disclosure, the first UE and the second UE convey SL UE assistance information therebetween to coordinate the resources for transmission and reception between UE in unicast/multicast communication, thus the problem of collision between signal transmission and signal reception due to the half-duplex issue is avoided, and the communication reliability of unicast/multicast is improved.

In a specific embodiment of the present disclosure, the first UE is a Tx UE, and the second UE is an Rx UE. Here, the Tx UE is UE actively initiating transmission of information and the Rx UE is UE receiving the information in a procedure of establishing unicast or multicast on a sidelink. The step 31 includes a step 311.

Step 311, receiving, by the first UE, the SL UE assistance information transmitted by at least one second UE; the SL UE assistance information includes at least one piece of pattern information determined by the second UE according to the service conducted by the second UE.

The pattern information includes at least one of: a transmission periodicity (Periodicity), a time interval between a time-domain resource occupied by the SL UE assistance information and a time-domain resource occupied by a transport block (Offset), a quantity of repetitions of the transport block within the periodicity (repK), an indication of a starting symbol, a symbol length and a mapping type (mapping type AB) of the transport block (time Domain Allocation); wherein the mapping type includes a slot based mapping or a symbol based mapping, for example.

The transport block described in the embodiments of the present disclosure is a data block of a single information transmission.

Specifically, the step 311 covers a unicast scenario in which the first UE and one second UE convey the SL UE assistance information therebetween, and a multicast scenario in which the first UE and multiple second UE convey the SL UE assistance information therebetween.

In a unicast scenario, the Tx UE transmits information to the Rx UE, and the Tx UE operates in the mode2.

A specific implementation of the step 311 includes: the first UE (Tx UE) receives the SL UE assistance information transmitted by the second UE (Rx UE) via a radio resource control (RRC) message or medium access control control element (MAC CE).

If there is an update to the service of the second UE, e.g., there is an update to the pattern for the service, or there is a variation in channel condition, the information transmission method further includes a step 312.

Step 312, the first UE (Tx UE) receives SL UE assistance update information transmitted by the second UE (Rx UE) via a radio resource control (RRC) message or medium access control control element (MAC CE).

Specifically, the SL UE assistance update information includes SL UE assistance information for all services in an active state; in other words, the second UE (Rx UE) transmits all semi-persistent scheduling (SPS) pattern information; for example, if the Rx UE has multiple active SPS services, the Rx UE needs to include all active SPS pattern information in the SL UE assistance information, which includes one or more of: Periodicity, Offset, repK, timeDomainAllocation, and mapping typeA/B.

Alternatively, the SL UE assistance update information may only include SL UE assistance information for a newly activated and/or newly deactivated service. For example, if there is an update to the SPS service of the Rx UE during the unicast data service transmission, the Rx UE needs to transmit updated SL UE assistance information, i.e., partly updated pattern information, to the Tx UE.

Correspondingly, the above step 32 may specifically include a step 321 and a step 322.

Step 321, excluding, by the first UE in determining the resource occupied by the transmission between the first UE and the second UE, a time-domain resource at a time moment of $t+offset+y\times Periodicity$ greater than $n+T1$ and less than $n+T2$ in a case that $t+offset$ is less than or equal to $n+T2$; not excluding a time-domain resource in a case that $t+offset$ is greater than $n+T2$; optionally, the step 321 is performed in a case that a service conducted between the first UE and the second UE is a dynamic service;

where, $y=0, 1, 2, \ldots, N$, N is a positive integer; t is a receiving moment when the first UE receives the SL UE assistance information; offset is a time interval between a time-domain resource occupied by the SL UE assistance information and a time-domain resource occupied by a transport block; n is a time moment when the first UE selects a resource; $n+T1$ is a starting moment of a resource selection window; $n+T2$ is an ending moment of the resource selection window; Periodicity is a transmission periodicity included in the SL UE assistance information.

Step 322, excluding, by the first UE in determining the resource occupied by the transmission between the first UE and the second UE, a time-domain resource at a time moment of $t+offset+y\times Periodicity$ greater than $n+T1$ and less than $n+T2$ and a time-domain resource at a time moment z in a case that $t+offset$ is less than or equal to $n+T2$;

excluding, by the first UE in determining the resource occupied by the transmission between the first UE and the second UE, a time-domain resource at a time moment z' in a case that $t+offset$ is greater than $n+T2$; optionally, the step 322 is performed in a case that a service conducted between the first UE and the second UE is an SPS service;

where, the time moment z is greater than $n+T1$ and less than $n+T2$, and $z+m\times P=t+offset+q\times Periodicity$, $m=1, 2, \ldots, N1$, $q=1, 2, \ldots, N2$; both N1 and N2 are positive integers;

the time moment z' is greater than $n+T1$ and less than $n+T2$, and $z'+m'\times P=t+offset+q'\times Periodicity$, $m'=1, 2, \ldots, N1'$, $q'=1, 2, \ldots, N2'$; both N1' and N2' are positive integers;

t is a time moment when the first UE receives the SL UE assistance information; offset is a time interval between a time-domain resource occupied by the SL UE assistance information and a time-domain resource occupied by a transport block; n is a time moment when the first UE selects a resource; n+T1 is a starting moment of a resource selection window; n+T2 is an ending moment of the resource selection window; P is a transmission periodicity of the transmission between the first UE and the second UE; Periodicity is a transmission periodicity included in the SL UE assistance information.

In the above manner of resource exclusion, exclusion is performed on resources reserved for each periodicity. If optional resources derived from the above manner of exclusion are too few, for example, the quantity of optional resources is zero or less than a preset value, e.g., 20% of total sum of resources, a resource re-selection is needed.

In a case that the resource re-selection is performed, the information transmission method further includes: in a case that a quantity of optional resources in the resource selection window is less than a preset threshold or there are no optional resource, narrowing down value ranges of m, q, m', q' respectively, e.g., narrowing down the value range to a preset value or proportionally narrowing down the value range by ½, and re-determining a resource. For example, a maximum value is set to 5, i.e., the value range includes: (0), 1, 2, 3, 4, 5, and it is considered that a resource may no longer be occupied after five times of transmission.

Specific example 1: a specific implementation procedure of the foregoing embodiment in a unicast scenario is illustrated for example hereinafter, in which the Tx UE transmits information to the Rx UE, and the Tx UE operates in the mode2.

The Rx UE needs to transmit SL UE assistance information, which includes SPS pattern information for the service being conducted by the Rx UE, to the Tx UE to assist the Tx UE in selecting a resource. Sidelink V2X supports two types of services: semi-persistent scheduling (SPS) service (Configured grant is one of SPS services) and dynamic service. For the service being conducted by the Rx UE, there are two situations as follows.

1. The Rx UE conducts SPS service with another UE, and the Rx UE needs to inform the Tx UE of the SPS pattern information for the conducted service.

2. The Rx UE conducts dynamic service with another UE, and the Rx UE may adjust the transmitting moment of the dynamic service according to the unicast service transmitted by the Tx UE. Specifically, the Rx UE may select a resource according to a reserved periodicity of the unicast service transmitted by the Tx UE. When transmitting information, the Tx UE may indicate the time interval to the next transmission.

Thus, the SPS pattern information included in the SL UE assistance information transmitted by the Rx UE to the Tx UE specifically contains the following information (includes one or more of the following information):

periodicity: the transmission periodicity of the SPS service;

offset: a time interval between a time-domain resource occupied by the SL UE assistance information and a time-domain resource occupied by a transport block of the SPS service;

here, the time-domain resource is the time-domain resource occupied by a single SPS service, may be a slot, mini-sot or symbol, and the offset is in unit of slot, mini-slot or symbol; to ensure reliability, plural transmission of the SL UE assistance information may be supported;

a first implementation of the plural times of transmission of the SL UE assistance information: the offset is a time interval between a time-domain resource occupied by the first transmission of the SL UE assistance information and a time-domain resource occupied by a transport block of the SPS service; the offset value of the SL UE assistance information remains constant in all transmission;

the control signaling for each transmission needs to indicate the time-domain resource occupied by the first transmission, to allow for a situation in which the Tx UE fails to receive the first transmission of the SL UE assistance information;

a second implementation of the plural transmission of the SL UE assistance information: the offset is a time interval between a time-domain resource occupied by the current transmission of the SL UE assistance information and a time-domain resource occupied by a transport block of the SPS service; the offset value in each transmission of the SL UE assistance information varies with the time-domain resource occupied by each transmission of the SL UE assistance information;

repK: a quantity of repetitions of the transport block within a periodicity, that is, occupying K consecutive time-domain resource units;

optionally, timeDomainAllocation: it is used to indicate a starting symbol, a symbol length and a mapping typeA/B of the transport block of the SPS service (the mapping type A is slot based, i.e., the unit of scheduling is one slot; the mapping type B is mini-slot based, i.e., the unit of scheduling is x symbols, x=1, 2, 3, . . . );

if the timeDomainAllocation is absent, then the SL UE assistance information, by default, occupies one slot or x symbols, x=1, 2, 3, . . . ;

if the Rx UE has multiple active SPS services, the Rx UE needs to include all active SPS pattern information in the SL UE assistance information: one or more of Periodicity, Offset, repK, and timeDomainAllocation (optional).

The manner of transmitting the SL UE assistance information includes a manner 1 and a manner 2.

Manner 1: an SL RRC message is used to transmit the SL UE assistance information. It is assumed that a maximum of 8 SPS services may be configured, and a maximum of 8 active SPS services are supported at the same time. As for specific values of the parameters, for example, Periodicity has 64 candidate values, Offset is an integer selected from 0 to 8000, repK has 4 candidate values, timeDomainAllocation has 8 candidate values, etc.

Specifically, the RRC IE may be:

```
SL-UE-assistance-information List SEQUENCE(SIZE (1..maxNrofActiveSPS))
OF SL-UE-assistance-information
    SL-UE-assistance-information ::= SEQUENCE {periodicity
ENUMERATED {specific value of periodicity },
    Offset INTEGER (specific value of Offset),
    repK ENUMERATED { specific value of repK },
```

-continued

```
timeDomainAllocation INTEGER  (specific value of timeDomainAllocation),
    ...}
```

wherein, the maxNrofActiveSPS is a maximum quantity of active SPS services that are supported at the same time.

Figure 4:
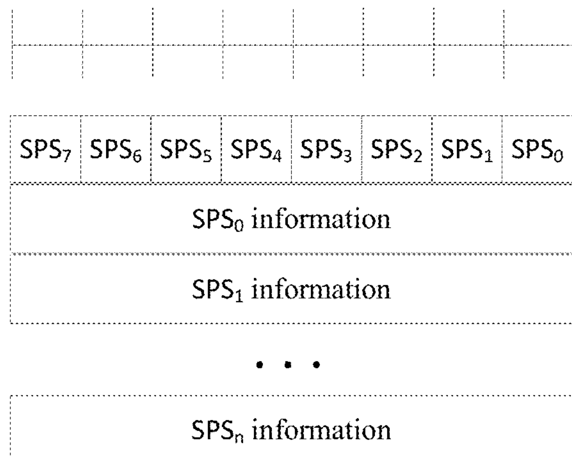
FIG. 4 is a schematic diagram of a format of MAC CE of the SL UE assistance information in an embodiment of the present disclosure.

Manner 2: as shown in FIG. 4, SL MAC CE is used to transmit the SL UE assistance information. A specific format of the MAC CE is designed as follows.

It is assumed that a maximum of 8 SPS services may be configured, and a maximum of 8 active SPS services are supported at the same time.

If SPSx=1, the MAC CE includes corresponding SPS information, x=0, 1, . . . , 7.

If SPSx=0, the MAC CE does not include corresponding SPS information, x=0, 1, . . . , 7.

The SPS information at least includes one or more of Periodicity, Offset, repK, and timeDomainAllocation (optional). As for the quantity of bits, for example, Periodicity has 6 bits (representing 64 periodicity values), repK has 2 bits, Offset has 13 bits (when the subcarrier spacing is 120 KHz, a maximum quantity of slots contained in one second is 8000, thus 13 bits are required to indicate Offset), timeDomainAllocation has 3 bits (indicating eight combinations of time-domain resource starting positions and lengths), thus a total is 24 bits. A correspondence between the bit values of the SPS information and actual values needs to be defined in the protocol in advance, or the correspondence may be configured by a base station or preconfigured. For example, if Periodicity has 6 bits, a correspondence between the six bits and 64 periodicity values needs to be defined in the protocol in advance, or the correspondence may be configured by a base station or preconfigured. A similar procedure is applicable to other information, which is not described in detail herein.

Transmission occasion for the SL UE assistance information: depending on the UE implementation, the Tx UE needs the SL UE assistance information when selecting a transmission resource for conducting a unicast service, therefore the SL UE assistance information should be transmitted after or during the establishment of unicast connection between the Tx UE and the Rx UE.

If there is an update to the SPS service of the Rx UE during the unicast data service transmission, e.g., an SPS service is newly activated or deactivated, or there is a variation in channel condition, the Rx UE needs to update SL UE assistance information for the Tx UE. There are two specific update procedures as follows.

Procedure 1: the Rx UE transmits complete SPS service information, that is, the SL UE assistance information includes information for all currently active SPS services. Having received the newest SL UE assistance information, the Tx UE replaces a previous SL UE assistance information with the newest SL UE assistance information. The transmission may be by means of an RRC message or MAC CE, and a specific format thereof is the same as that in the initial transmission and is not described in detail herein. The procedure is simple and easy to implement.

Procedure 2: the Rx UE transmits partly updated SPS pattern information, that is, the SL UE assistance information includes only updated information for the SPS service. Having received the updated SL UE assistance information, the Tx UE carries out an update on the basis of the original SL UE assistance information.

The transmission may be by means of an RRC message or MAC CE, and a specific format thereof is as follows.

RRC message: only updated or newly activated SPS pattern is transmitted. For each SPS service, 1 bit is used to indicate whether the SPS service is activated in the current update. For example, the 1 bit being 1 represents that the SPS service is a deactivated service in the current update; and the 1 bit being 0 represents that the SPS service is not a deactivated service in the current update, probably, only the SPS pattern information for the service is updated or the service is a newly activated service in the current update.

Figure 5:
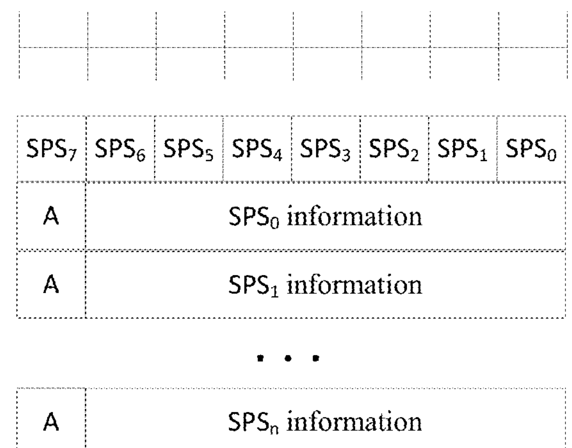
FIG. 5 is a schematic diagram of a format of MAC CE of the SL UE assistance information in another embodiment of the present disclosure.

As shown in FIG. 5, MAC CE format: the initial SL UE assistance information MAC CE and updated SL UE assistance information MAC CE may be distinguished from each other by means of an LCID.

A specific MAC CE format: SPSx=1 represents that there is an update to the $x^{th}$ SPS service, and the MAC CE includes corresponding SPS information, x=0, 1, . . . , 7; SPSx=0 represents that there is no update to the $x^{th}$ SPS service, and the MAC CE does not include corresponding SPS information, x=0, 1, . . . , 7.

A represents an activation/deactivation identifier. A=1 represents that the SPS service is a newly activated service, or the SPS service is a formerly activated SPS service and there is a change to the SPS pattern information. A=0 represents that the SPS service is deactivated in the current update. If the identifier bit A of SPSx is equal to 0, the information of the SPSx may be ignored.

The SPS information at least includes Periodicity, Offset, repK and timeDomainAllocation (optional), which is the same as the initial transmission and is not described in detail herein.

Figure 6:
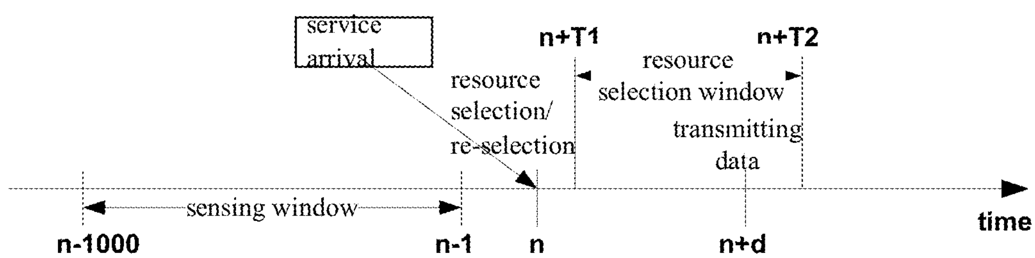
FIG. 6 is a timing diagram of V2X mode2 resource selection in an embodiment of the present disclosure.

As shown in FIG. 6, a timing diagram of V2X mode2 resource selection is illustrated. The Tx UE selects a resource according to the received SL UE assistance information. A specific procedure is as follows.

Here, a single SPS service is taken as an example. For multiple SPS services, exclusion is performed on the time-domain resource occupied by each SPS service.

It is assumed that the time moment when the Tx UE receives the SL UE assistance information is t.

If the Tx UE transmits a dynamic service to the Rx UE, that is, a one-shot information transmission, then the corresponding resource exclusion manner is as follows.

The Tx UE excludes, in selecting a resource, a time-domain resource at a time moment of t+offset+y×Periodicity greater than T1 and less than T2 in a case that t+offset is less than or equal to n+T2 (there may be one or more excluded time-domain resources), wherein y=0, 1, 2, . . . ; the Tx UE does not exclude a time-domain resource in a case that t+offset is greater than n+T2.

If the Tx UE transmits an SPS service with a periodicity of P to the Rx UE, then the corresponding resource exclusion manner is as follows.

The Tx UE needs to exclude, in selecting a resource, a time-domain resource at a time moment of t+offset+y× Periodicity greater than T1 and less than T2 as well as a time-domain resource at a time moment z in a case that t+offset is less than or equal to n+T2, wherein, the time moment z is greater than T1 and less than T2, and z+m× P=t+offset+q×Periodicity, m=1, 2, . . . , q=1, 2, . . . .

The Tx UE needs to exclude, in selecting a resource, a time-domain resource at a time moment z' in a case that t+offset is greater than n+T2; wherein the time moment z' is greater than T1 and less than T2, and $z'+m'\times P=t+offset+q'\times Periodicity$, m'=1, 2, . . . , q'=1, 2, . . . .

In the above manner of resource exclusion, exclusion is performed on resources reserved for each periodicity. If optional resources derived from the above manner of exclusion are too few (the quantity of optional resources is zero or less than 20% of total sum of resources), a resource re-selection is needed. When the resource re-selection is performed, value ranges of m, q, m', q' may be narrowed down respectively, e.g., narrowed down to a preset value or proportionally narrowed down by ½. For example, a maximum value is set to 5, i.e., the value range includes: (0), 1, 2, 3, 4, 5, and it is considered that a resource may no longer be occupied after five times of SPS transmission, thus taking at most five times of transmission into account is sufficient.

In a multicast scenario, the Tx UE transmits information to the Rx UE, and the Tx UE operates in the mode2.

When the quantity of the second UE is at least two, the step 32 includes: grouping the at least two second UEs, and determining the resource occupied by the transmission between the first UE and the second UE according to the SL UE assistance information of each second UE in each group.

The foregoing method may further includes: in a case that a quantity of optional resources in the resource selection window is less than a preset threshold or there is no optional resource, grouping the second UEs, and re-determining the resource occupied by the transmission between the first UE and the second UE according to the SL UE assistance information of each second UE in each group.

Figure 1:
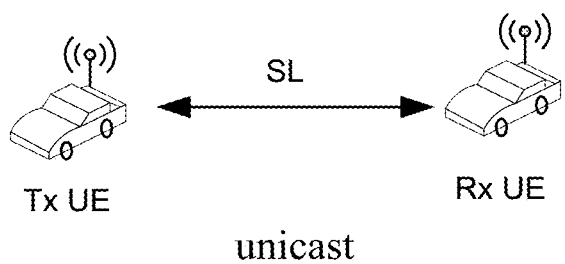
FIG. 1 is a schematic diagram of a unicast scenario.
Figure 2:
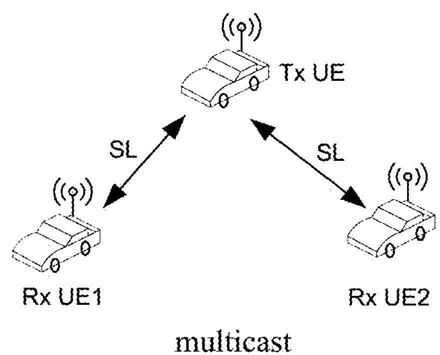
FIG. 2 is a schematic diagram of a multicast scenario.

As shown in FIG. 2, for example, the Tx UE transmits information to multiple Rx UEs, and the multiple Rx UEs transmit the SL UE assistance information to the Tx UE. Each Rx UE needs to transmit the SL UE assistance information to the Tx UE. The Tx UE determines the resource occupied by the Tx UE for the multicast information transmission according to the SL UE assistance information transmitted by each Rx UE. The design and update procedure of the SL UE assistance information is the same as that used in the unicast scenario, which is not described in detail herein.

The Tx UE selects a resource according to the received SL UE assistance information which is transmitted by multiple Rx UEs. A specific procedure is similar to that used in the unicast scenario. A difference resides in that: if optional resources are too few (the quantity of optional resources is zero or less than 20% of total sum of resources) after corresponding slots or symbols are excluded according to the SL UE assistance information, a Tx UE transmission failure may result, in this case, the multiple Rx UEs may be grouped into m groups, the Tx UE performs resource selection separately according to each Rx UE group and transmits the multicast information m times.

Specific example 2: in a multicast communication scenario, both UE1 and UE2 need to transmit SL UE assistance information to the Tx UE:

- the SL UE assistance information transmitted by the UE1 includes the SPS pattern information of the UE1;
- the SL UE assistance information transmitted by the UE2 includes the SPS pattern information of the UE2;
- the design of specific SL UE assistance information is the same as that in the unicast scenario, which is not described in detail herein.

The Tx UE selects a resource according to the received SL UE assistance information which is transmitted by multiple Rx UEs. For example, the Tx UE selects a resource according to the SL UE assistance information received from UE1 and UE2, and performs exclusion on optional resources according to the SPS pattern information in the SL UE assistance information of each UE. A specific exclusion method is the same as that in the unicast scenario, which is not described in detail herein.

If there is relatively great number of Rx UEs in a group, and no optional resource remains or the remaining optional resources are too few (such as less than P %, e.g., 20%, of total sum of optional resources) after corresponding time-domain resources are excluded according to the SPS service information in the SL UE assistance information of each UE, the Tx UE may fail to select the resource, resulting in a transmission failure. In this case, a resource re-selection is needed. Specific steps of the re-selection are as follows.

The Rx UEs in a group are grouped into m groups, e.g., 2 groups.

The specific grouping rule may be implemented based on UE. The quantities of UEs in the groups may be uniform or non-uniform. For example, the grouping is done according to UE ID, that is, those UEs with odd UE IDs are grouped into one group, and those UEs with even UE IDs are grouped into another group. Alternatively, the UEs are ordered according to the sequence of UE ID, the first half of UEs are grouped into one group, and the second half of UEs are grouped into another group. It is noted, the UEs are merely grouped virtually in resource selection, in reality, the Rx UEs still perform multicast communication as a group with the Tx UE. The Tx UE performs resource selection separately according to each virtual group of Rx UEs, to select m resources, and repetitively transmits the multicast information for m times. In this way, each Rx UE may receive the multicast information.

For example, the Rx UEs are grouped into 2 groups, and a specific procedure is as follows:

- step 1: the Tx UE performs resource selection according to SL UE assistance information of each Rx UE in group 1, and transmits multicast information on the selected resource 1;
- step 2: the Tx UE performs resource selection according to SL UE assistance information of each Rx UE in group 2, and transmits multicast information on the selected resource 2;
- in the above two steps, the transmitted multicast information is the same message, that is, the same message is transmitted on different resources, such that all UE in the group may receive the message.

In another unicast scenario, the first UE is an Rx UE, and the second UE is a Tx UE, the step 31 includes:

A step 312, the first UE receives the SL UE assistance information transmitted by one second UE, wherein the SL UE assistance information includes at least one pattern information selected by the Tx UE according to a monitored channel condition.

In the step 312, the Tx UE selects at least one pattern information according to a monitored channel condition and transmits the same to an Rx UE. After interacting with the Rx UE, the Tx UE finally determines one pattern. The pattern is used to transmit information between the Tx UE and the Rx UE.

The pattern information is similar to that in the example 1 in the unicast scenario, and includes: a transmission periodicity, a time interval between a time-domain resource occupied by the SL UE assistance information and a time-domain resource occupied by a transport block, a quantity of repetitions of the transport block within the periodicity, an indication of a starting symbol, a symbol length and a mapping type of the transport block; wherein the mapping type includes a slot based mapping or a symbol based mapping.

Correspondingly, the above step 32 includes: the first UE determines at least one pattern from the SL UE assistance information, and transmits feedback on the SL UE assistance information to the second UE, wherein the feedback information indicates or includes the at least one pattern; or, the first UE transmits feedback information about the SL UE assistance information to the second UE, wherein the feedback information instructs the second UE to retransmit the SL UE assistance information, and the SL UE assistance information includes at least one piece of new pattern information.

The information transmission method further includes: the first UE transmits an SL UE assistance information update request to the second UE if there is an update to the SL UE assistance information of the service of the first UE, wherein the SL UE assistance information update request instructs the second UE to retransmit the SL UE assistance information, and the SL UE assistance information includes at least one piece of new pattern information.

Specific example 3: in a unicast scenario, a Tx UE transmits SL UE assistance information to an Rx UE, wherein the SL UE assistance information includes SPS pattern information selected by the Tx UE according to monitored channel condition, and may include one or more pieces of SPS pattern information. The SPS pattern information is a SPS pattern that the Tx UE intends to use for the communication with the Rx UE.

The content of the SL UE assistance information includes pattern information for each SPS: one or more of Periodicity, Offset, repK, and timeDomainAllocation (optional).

The transmission of the SL UE assistance information may be by means of an RRC message or MAC CE.

A specific negotiation procedure is as follows.

The Rx UE needs to determine, according to its own service, whether the SPS pattern included in the SL UE assistance information is appropriate, and feeds back one or more appropriate SPS patterns to the TX UE. The Tx UE subsequently communicates with the Rx UE according to at least one SPS pattern in the one or more SPS patterns.

If none of the SPS patterns in the SL UE assistance information transmitted by the Tx UE is appropriate, the Rx UE needs to give a feedback that all of the SPS patterns are inappropriate. Then the Tx UE needs to re-select a new SPS pattern and re-transmit SL UE assistance information including the newly selected SPS pattern. The procedure continues until the negotiation between the Tx UE and the Rx UE yields an appropriate SPS pattern.

If the SPS service (SPS service communicated with other UE) pattern of the Rx UE changes, or the channel condition changes, an update procedure needs to be initiated.

Firstly, the Rx UE initiates, to the Tx UE, an update request for an update of the current pattern of the SPS service communicated between the Rx UE and the Tx UE. The update request may be transmitted via an RRC message or MAC CE.

After receiving the update request, the Tx UE selects a new SPS pattern and negotiates with the Rx UE on the new SPS pattern.

In this embodiment, the Tx UE transmits SL UE assistance information to the Rx UE, wherein the SL UE assistance information includes SPS pattern information selected by the Tx UE according to monitored channel condition, and may include one or more pieces of SPS pattern information. The SPS pattern information is a SPS pattern that the Tx UE intends to use for the communication with the Rx UE.

The content of the SL UE assistance information is the same as that in the embodiment 1, which is not described in detail herein.

The embodiment differs from the unicast scenario described in the above specific example 1 in that the SL UE assistance information is transmitted by the Tx UE to the Rx UE, and the SL UE assistance information includes one or more SPS patterns that the Tx UE intends to use for the communication with the Rx UE. Thus, the Rx UE needs to determine, according to its own service, whether these SPS patterns are appropriate, e.g., select an SPS pattern allowing proper service reception according to the Rx UE's own SPS service (SPS service communicated with other UE) pattern, the half-duplex principle or the channel condition, and feeds back an appropriate SPS pattern to the Tx UE. The Tx UE subsequently communicates with the Rx UE according to the SPS pattern. If none of the SPS patterns in the SL UE assistance information transmitted by the Tx UE is appropriate, the Rx UE needs to give a feedback that all of the SPS patterns are inappropriate. Then the Tx UE needs to re-select a new SPS pattern and re-transmit SL UE assistance information. The procedure continues until the negotiation between the Tx UE and the Rx UE yields an appropriate SPS pattern.

If the SPS service (SPS service communicated with other UE) pattern of the Rx UE changes, an update procedure needs to be initiated. Different from the embodiment 1, the update procedure requires that the Rx UE firstly initiates, to the Tx UE, an update request for an update of the current pattern of the SPS service communicated between the Rx UE and the Tx UE. The update request may be transmitted via an RRC message or MAC CE. After receiving the update request, the Tx UE selects a new SPS pattern (which is selected according to the monitored channel occupancy condition) and transmits, via the SL UE assistance information, to the Rx UE one or more SPS patterns that the Tx UE intends to use for the communication with the Rx UE. The Rx UE then feeds back an appropriate SPS pattern to the Tx UE. If none of the SPS patterns in the SL UE assistance information transmitted by the Tx UE is appropriate, the Rx UE needs to give a feedback that all of the SPS patterns are inappropriate. Then the Tx UE needs to re-select a new SPS pattern and re-transmit SL UE assistance information. The procedure continues until the negotiation between the Tx UE and the Rx UE yields an appropriate SPS pattern.

In the foregoing embodiment of the present disclosure, the Tx UE and the Rx UE convey SL UE assistance information therebetween to coordinate the resources for transmission and reception between UEs in unicast/multicast communication, and a mode2 resource selection method based on assistance information is designed, thus the problem of collision between signal transmission and signal reception due to the half-duplex issue is avoided, the communication reliability of unicast/multicast is improved and the service latency requirement is met.

Figure 7:
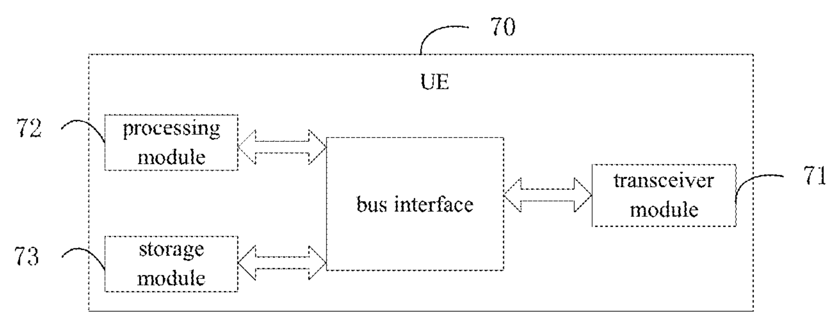
FIG. 7 is a schematic diagram of architecture of UE in an embodiment of the present disclosure.

As shown in FIG. 7, an embodiment of the present disclosure further provides UE 70. The UE 70 includes:

a transceiver module 71, configured to receive SL UE assistance information transmitted by second UE, wherein the SL UE assistance information includes at least one piece of pattern information;

a processing module 72, configured to determine, according to the SL UE assistance information, a resource occupied by transmission between the UE and the second UE.

The transceiver module 71 is specifically configured to: receive the SL UE assistance information transmitted by at least one second UE.

The pattern information includes at least one of: a transmission periodicity, a time interval between a time-domain resource occupied by the SL UE assistance information and a time-domain resource occupied by a transport block, a quantity of repetitions of the transport block within the periodicity, an indication of a starting symbol, a symbol length and a mapping type of the transport block; wherein the mapping type includes a slot based mapping or a symbol based mapping.

The transceiver module 71 is specifically configured to: receive the SL UE assistance information transmitted by the second UE via a radio resource control (RRC) message or a medium access control control element (MAC CE).

The transceiver module 71 is further configured to receive SL UE assistance update information transmitted by the second UE via a radio resource control (RRC) message or a medium access control control element (MAC CE).

The SL UE assistance update information includes SL UE assistance information for all services in an active state; or, the SL UE assistance update information includes SL UE assistance information for a newly activated and/or newly deactivated service.

The processing module 72 is specifically configured to: exclude, in determining the resource occupied by the transmission between the first UE and the second UE, a time-domain resource at a time moment of t+offset+y×Periodicity greater than n+T1 and less than n+T2 in a case that t+offset is less than or equal to n+T2;

not exclude a time-domain resource in a case that t+offset is greater than n+T2;

where, y=0, 1, 2, . . . , N, N is a positive integer; t is a receiving moment when the UE receives the SL UE assistance information; offset is a time interval between a time-domain resource occupied by the SL UE assistance information and a time-domain resource occupied by a transport block; n is a time moment when the UE selects a resource; n+T1 is a starting moment of a resource selection window; n+T2 is an ending moment of the resource selection window; Periodicity is a transmission periodicity included in the SL UE assistance information.

The processing module 72 is specifically configured to: exclude, in determining the resource occupied by the transmission between the first UE and the second UE, a time-domain resource at a time moment of t+offset+y×Periodicity greater than n+T1 and less than n+T2, and a time-domain resource at a time moment z, in a case that t+offset is less than or equal to n+T2;

exclude, in determining the resource occupied by the transmission between the first UE and the second UE, a time-domain resource at a time moment z' in a case that t+offset is greater than n+T2;

where, the time moment z is greater than n+T1 and less than n+T2, and z+m×P=t+offset+q×Periodicity, m=1, 2, . . . , N1, q=1, 2, . . . , N2; both N1 and N2 are positive integers;

the time moment z' is greater than n+T1 and less than n+T2, and z'+m'×P=t+offset+q'×Periodicity, m'=1, 2, . . . , N1', q'=1, 2, . . . , N2'; both N1' and N2' are positive integers;

t is a time moment when the UE receives the SL UE assistance information; offset is a time interval between a time-domain resource occupied by the SL UE assistance information and a time-domain resource occupied by a transport block; n is a time moment when the UE selects a resource; n+T1 is a starting moment of a resource selection window; n+T2 is an ending moment of the resource selection window; P is a transmission periodicity of the transmission between the UE and the second UE; Periodicity is a transmission periodicity included in the SL UE assistance information.

The processing module 72 is further configured to:

narrow down value ranges of m, q, m', q' respectively and re-determine a resource occupied by the transmission between the first UE and the second UE in a case that a quantity of resources determined in the resource selection window is less than a preset threshold.

There are at least two second UEs, and the processing module is specifically configured to, in re-determining the resource:

group the second UEs, and determine the resource occupied by the transmission between the first UE and the second UE according to the SL UE assistance information of each second UE in each group.

The processing module 72 is further configured to: determine at least one pattern from the SL UE assistance information, and the transceiver module of the UE transmits feedback information about the SL UE assistance information to the second UE, wherein the feedback information indicates or includes the at least one pattern; or, the transceiver module of the UE transmits feedback information about the SL UE assistance information to the second UE, wherein the feedback information instructs the second UE to retransmit the SL UE assistance information, and the SL UE assistance information includes at least one piece of new pattern information.

If there is an update to the SL UE assistance information of the service of the second UE, the transceiver module of the UE transmits an SL UE assistance information update request to the second UE, wherein the SL UE assistance information update request instructs the second UE to retransmit the SL UE assistance information, and the SL UE assistance information includes at least one piece of new pattern information.

It is noted, the UE is UE corresponding to the method as shown in FIG. 3, all implementations of the above method embodiment are applicable to the UE embodiment and may achieve the same technical effect.

The UE may further includes: a storage module 73, a transceiver module 71 and a processing module 72. The transceiver module 71 and the storage module 73 may be connected through a bus interface. The function of the transceiver module 71 may be implemented by the processing module 72, and vice versa.

An embodiment of the present disclosure further provides an information transmission method. The method includes:

transmitting, by second UE, SL UE assistance information including at least one piece of pattern information to first UE, such that the first UE determines, according to the SL UE assistance information, a resource occupied by transmission between the first UE and the second UE.

It is noted, in the foregoing embodiment, all implementations of the second UE are applicable to the embodiment and may achieve the same technical effect.

For example, in one specific embodiment, the first UE determines at least one pattern from the SL UE assistance information, and the second UE receives feedback information, transmitted by the first UE, on the SL UE assistance information, wherein the feedback information indicates or includes the at least one pattern; or, the second UE receives feedback information, transmitted by the first UE, on the SL UE assistance information, wherein the feedback information instructs the second UE to retransmit the SL UE assistance information, and the SL UE assistance information includes at least one piece of new pattern information.

The information transmission method further includes: if there is an update to the SL UE assistance information of the service of the first UE, the second UE receives an SL UE assistance information update request transmitted by the first UE, wherein the SL UE assistance information update request instructs the second UE to retransmit the SL UE assistance information, and the SL UE assistance information includes at least one piece of new pattern information.

An embodiment of the present disclosure further provides UE, including:

a transceiver module, configured to transmit SL UE assistance information including at least one piece of pattern information to first UE, such that the first UE determines, according to the SL UE assistance information, a resource occupied by transmission between the first UE and the second UE.

It is noted, the UE is UE corresponding to the method on the second UE side, and all implementations of the above method embodiment are applicable to the UE embodiment and may achieve the same technical effect.

An embodiment of the present disclosure further provides UE, including a processor, wherein the processor is configured to implement following function: receiving SL UE assistance information transmitted by second UE, wherein the SL UE assistance information includes at least one piece of pattern information; determining, according to the SL UE assistance information, a resource occupied by transmission between the UE and the second UE. It is noted, the UE is UE corresponding to the method as shown in FIG. 3, and all implementations of the above method embodiment are applicable to the UE embodiment and may achieve the same technical effect.

An embodiment of the present disclosure further provides UE, including a processor, wherein the processor is configured to implement following function: transmitting SL UE assistance information to first UE, such that the first UE determines, according to the SL UE assistance information, a resource occupied by transmission between the first UE and the second UE; wherein the SL UE assistance information includes at least one piece of pattern information. It is noted, the UE is second UE, and all implementations of the above method embodiment on the second UE side are applicable to the UE embodiment and may achieve the same technical effect.

An embodiment of the present disclosure further provides a computer storage medium including an instruction, wherein the instruction is configured to be executed by a computer, to cause the computer to implement the foregoing methods.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be understood that these embodiments described in this disclosure may be implemented by hardware, software, firmware, middleware, microcode or a combination thereof. For hardware implementation, a processing unit may be implemented in one or more application specific integrated circuits (ASICs), a digital signal processor (DSP), a DSP device (DSPD), a programmable logic device (PLD), a field-programmable gate array (FPGA), a general-purpose processor, a controller, a microcontroller, a microprocessor, other electronic unit configured to perform the functions in the present disclosure or a combination thereof.

For a software implementation, the techniques described in embodiments of the present disclosure may be implemented by modules (for example, processes, functions or the like) performing the functions described in embodiments of the present disclosure. Software codes may be stored in a storage and executed by a processor. The storage may be implemented internal or external to a processor.

It may be clearly understood by a person skilled in the art that, for ease of description and conciseness, for a detailed working process of the foregoing system, apparatus and unit, reference may be made to a corresponding process in the foregoing method embodiments, and details are not described herein again.

In the embodiments provided in the present disclosure, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, an essential part or the part contributing to the prior art of the technical solutions of the present disclosure, or a part of the technical solutions may be implemented in a form of a software product. The computer software product is stored in a storage medium, and includes several instructions for instructing a computer device (which may be a personal computer, a server, a network device or the like) to perform all or a part of the steps of the methods described in the embodiments of the disclosure. The foregoing storage medium includes any medium that can store program code, such as a universal serial bus (USB) flash drive, a removable hard disk, a read-only memory (ROM), a random access memory (RAM), a magnetic disk, or an optical disc.

In addition, it should be noted that in the apparatus and the method of the present disclosure, apparently, parts or steps may be divided and/or re-combined. The divisions and/or re-combinations should be regarded as equivalent solutions of the present disclosure. Moreover, steps of the above series of processes may be performed naturally in a chronological order of description. However, the performing sequence is not limited to the chronological order. Some steps may be performed in parallel or independently. Persons of ordinary skill in the art would appreciate that all or any steps or parts of the methods and apparatuses of the present disclosure may be implemented in any computing apparatus (including a processor, a storage medium or the like) or a network of computing apparatuses in hardware, firmware, software or a combination thereof, and this can be achieved by persons of ordinary skill in the art by using their basic programming skill after reading the description of the present disclosure.

Thus, the object of the present disclosure may also be implemented by running a program or a set of programs on any computing apparatus. The computing apparatus may be a known general purpose apparatus. Thus, the object of the present disclosure may also be implemented merely by providing a program product which contains program code for implementing the methods or apparatuses. That is, such program product also constitutes the present disclosure, and a storage medium in which such a program product is stored also constitutes the present disclosure. Apparently, the storage medium may be any known storage medium or any storage medium that will be developed in the future. It should also be noted that, in the apparatuses and methods of the present disclosure, apparently, parts or steps may be divided and/or re-combined. The divisions and/or re-combinations should be regarded as equivalent solutions of the present disclosure. Moreover, steps of the foregoing series of processes may be performed naturally in a chronological order of description, however the performing sequence is not limited to the chronological order. Some steps may be performed in parallel or independently.

The foregoing describes optional implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. An information transmission method, comprising:

receiving, by first User Equipment (UE), Sidelink User Equipment (SL UE) assistance information transmitted by second UE, wherein the SL UE assistance information comprises at least one piece of pattern information for assisting the first UE to select a physical resource used by the first UE for direct transmission with the second UE; and determining, by the first UE, a resource occupied by the direct transmission between the first UE and the second UE, in accordance with the SL UE assistance information that comprises the at least one piece of pattern information for assisting the first UE to select the physical resource used by the first UE for the direct transmission with the second UE, wherein the pattern information comprises at least one of:

a time interval between a time-domain resource occupied by the SL UE assistance information and a time-domain resource occupied by a transport block, a quantity of repetitions of the transport block within a periodicity, an indication of a starting slot, a slot length, or a mapping type of the transport block, wherein the mapping type comprises a slot based mapping or a symbol based mapping, wherein the determining, by the first UE, the resource occupied by the direct transmission between the first UE and the second UE comprises:

excluding, by the first UE in determining the resource occupied by the direct transmission between the first UE and the second UE, a time-domain resource at a time moment of t+offset+y×Periodicity greater than n+T1 and less than n+T2 in a case that t+offset is less than or equal to n+T2;

not excluding a time-domain resource in a case that t+offset is greater than n+T2;

where, y=0, 1, 2, . . . , N, N is a positive integer; t is a receiving moment when the first UE receives the SL UE assistance information; offset is a time interval between a time-domain resource occupied by the SL UE assistance information and a time-domain resource occupied by a transport block; n is a time moment when the first UE selects a resource; n+T1 is a starting moment of a resource selection window; n+T2 is an ending moment of the resource selection window; Periodicity is a transmission periodicity comprised in the SL UE assistance information, or, wherein the determining, by the first UE, the resource occupied by the direct transmission between the first UE and the second UE comprises:

excluding, by the first UE in determining the resource occupied by the direct transmission between the first UE and the second UE, a time-domain resource at a time moment of t+offset+y×Periodicity greater than n+T1 and less than n+T2 and a time-domain resource at a time moment z in a case that t+offset is less than or equal to n+T2;

excluding, by the first UE in determining the resource occupied by the direct transmission between the first UE and the second UE, a time-domain resource at a time moment z' in a case that t+offset is greater than n+T2;

where, the time moment z is greater than n+T1 and less than n+T2, and z+m×P=t+offset+q×Periodicity, m=1, 2, . . . , N1, q=1, 2, . . . , N2; both N1 and N2 are positive integers;

the time moment z' is greater than n+T1 and less than n+T2, and z'+m'×P=t+offset+q'×Periodicity, m'=1, 2, . . . , N1', q'=1, 2, . . . , N2'; both N1' and N2' are positive integers;

t is a time moment when the first UE receives the SL UE assistance information; offset is a time interval between a time-domain resource occupied by the SL UE assistance information and a time-domain resource occupied by a transport block; n is a time moment when the first UE selects a resource; n+T1 is a starting moment of a resource selection window; n+T2 is an ending moment of the resource selection window; P is a transmission periodicity of the direct transmission between the first UE and the second UE; Periodicity is a transmission periodicity comprised in the SL UE assistance information.

2. The information transmission method according to claim 1, wherein the receiving, by the first UE, the SL UE assistance information transmitted by the second UE comprises:

receiving, by the first UE, the SL UE assistance information transmitted by at least one second UE.

3. The information transmission method according to claim 2, wherein the receiving, by the first UE, the SL UE assistance information transmitted by the second UE comprises:

receiving, by the first UE, the SL UE assistance information transmitted by the second UE via a Radio Resource Control (RRC) message or a Medium Access Control Control Element (MAC CE).

4. The information transmission method according to claim 3, wherein the first UE is a transmitting UE and the second UE is a receiving UE, and the method further comprises:

receiving, by the first UE, SL UE assistance update information transmitted by the second UE via an RRC message or an MAC CE.

5. The information transmission method according to claim 4, wherein, the SL UE assistance update information comprises SL UE assistance information for all services in an active state; or the SL UE assistance update information comprises SL UE assistance information for a newly activated or newly deactivated service.

6. The information transmission method according to claim 2, wherein there are at least two second UEs, and the determining, by the first UE, the resource occupied by the direct transmission between the first UE and the second UE comprises:

grouping the at least two second UEs, and determining the resource occupied by the direct transmission between the first UE and the second UE according to the SL UE assistance information of each second UE in each group.

7. The information transmission method according to claim 2, wherein the determining, by the first UE, the resource occupied by the direct transmission between the first UE and the second UE comprises:

determining, by the first UE, at least one pattern from the SL UE assistance information, and transmitting, by the first UE, feedback information about the SL UE assistance information to the second UE, wherein the feedback information indicates or comprises the at least one pattern; or, transmitting, by the first UE, feedback information about the SL UE assistance information to the second UE, wherein the feedback information instructs the second UE to retransmit the SL UE assistance information, and the SL UE assistance information comprises at least one piece of new pattern information.

8. The information transmission method according to claim 7, further comprising:

transmitting, by the first UE, an SL UE assistance information update request to the second UE, wherein the SL UE assistance information update request instructs the second UE to retransmit the SL UE assistance information, and the SL UE assistance information comprises at least one piece of new pattern information.

9. The information transmission method according to claim 1, further comprising:

narrowing down value ranges of m, q, m', q' respectively and re-determining a resource in a case that a quantity of optional resources in the resource selection window is less than a preset threshold.

10. The information transmission method according to claim 1, further comprising:

in a case that a quantity of optional resources in the resource selection window is less than a preset threshold, grouping the second UEs, and re-determining the resource occupied by the direct transmission between the first UE and the second UE according to the SL UE assistance information of each second UE in each group.

11. User equipment (UE), comprising: a processor and a memory therein a computer program being stored, wherein the UE is first UE, wherein upon calling and executing the computer program stored in the memory, the processor is configured to implement following operations:

receiving, by the first UE, Sidelink User Equipment (SL UE) assistance information transmitted by second UE, wherein the SL UE assistance information comprises at least one piece of pattern information for assisting the first UE to select a physical resource used by the first UE for transmission with the second UE;

determining, by the first UE, according to the SL UE assistance information, a resource occupied by the direct transmission between the first UE and the second UE, in accordance with the SL UE assistance information that comprises the at least one piece of pattern information for assisting the first UE to select the physical resource used by the first UE for direct transmission with the second UE, wherein the pattern information comprises at least one of:

a time interval between a time-domain resource occupied by the SL UE assistance information and a time-domain resource occupied by a transport block, a quantity of repetitions of the transport block within a periodicity, an indication of a starting slot, a slot length, or a mapping type of the transport block, wherein the mapping type comprises a slot based mapping or a symbol based mapping, wherein the determining, by the first UE, the resource occupied by the direct transmission between the first UE and the second UE comprises:

excluding, by the first UE in determining the resource occupied by the direct transmission between the first UE and the second UE, a time-domain resource at a time moment of $t+offset+y\times Periodicity$ greater than $n+T1$ and less than $n+T2$ in a case that $t+offset$ is less than or equal to $n+T2$;

not excluding a time-domain resource in a case that $t+offset$ is greater than $n+T2$;

where, $y=0, 1, 2, \ldots, N$, N is a positive integer; t is a receiving moment when the first UE receives the SL UE assistance information; offset is a time interval between a time-domain resource occupied by the SL UE assistance information and a time-domain resource occupied by a transport block; n is a time moment when the first UE selects a resource; $n+T1$ is a starting moment of a resource selection window; $n+T2$ is an ending moment of the resource selection window; Periodicity is a transmission periodicity comprised in the SL UE assistance information, or, wherein the determining, by the first UE, the resource occupied by the direct transmission between the first UE and the second UE comprises:

excluding, by the first UE in determining the resource occupied by the direct transmission between the first UE and the second UE, a time-domain resource at a time moment of t+offset+y×Periodicity greater than n+T1 and less than n+T2 and a time-domain resource at a time moment z in a case that t+offset is less than or equal to n+T2;

excluding, by the first UE in determining the resource occupied by the direct transmission between the first UE and the second UE, a time-domain resource at a time moment z' in a case that t+offset is greater than n+T2;

where, the time moment z is greater than n+T1 and less than n+T2, and z+m×P=t+offset+q×Periodicity, m=1, 2, . . . , N1, q=1, 2, . . . , N2; both N1 and N2 are positive integers;

the time moment z' is greater than n+T1 and less than n+T2, and z'+m'×P=t+offset+q'×Periodicity, m'=1, 2, . . . , N1', q'=1, 2, . . . , N2'; both N1' and N2' are positive integers;

t is a time moment when the first UE receives the SL UE assistance information; offset is a time interval between a time-domain resource occupied by the SL UE assistance information and a time-domain resource occupied by a transport block; n is a time moment when the first UE selects a resource; n+T1 is a starting moment of a resource selection window; n+T2 is an ending moment of the resource selection window; P is a transmission periodicity of the direct transmission between the first UE and the second UE; Periodicity is a transmission periodicity comprised in the SL UE assistance information.

12. The UE according to claim 11, wherein the receiving, by the first UE, the SL UE assistance information transmitted by the second UE comprises:

receiving, by the first UE, the SL UE assistance information transmitted by at least one second UE.

13. The UE according to claim 12, wherein the receiving, by the first UE, the SL UE assistance information transmitted by the second UE comprises:

receiving, by the first UE, the SL UE assistance information transmitted by the second UE via a Radio Resource Control (RRC) message or a Medium Access Control Control Element (MAC CE).

14. The UE according to claim 13, wherein the first UE is a transmitting UE and the second UE is a receiving UE, and the method further comprises:

receiving, by the first UE, SL UE assistance update information transmitted by the second UE via an RRC message or an MAC CE, wherein the SL UE assistance update information comprises SL UE assistance information for all services in an active state; or the SL UE assistance update information comprises SL UE assistance information for a newly activated or newly deactivated service.

* * * * *